United States Patent
Chien et al.

(10) Patent No.: US 8,655,097 B2
(45) Date of Patent: Feb. 18, 2014

(54) ADAPTIVE BILATERAL BLUR BRUSH TOOL

(75) Inventors: Jen-Chan Chien, Saratoga, CA (US); Michael W. Tao, Fremont, CA (US); Sylvain Paris, Boston, MA (US)

(73) Assignee: Adobe Systems Incorporated, San Jose, CA (US)

( * ) Notice: Subject to any disclaimer, the term of this patent is extended or adjusted under 35 U.S.C. 154(b) by 826 days.

(21) Appl. No.: 12/324,251

(22) Filed: Nov. 26, 2008

(65) Prior Publication Data

US 2013/0121606 A1      May 16, 2013

Related U.S. Application Data

(60) Provisional application No. 61/091,223, filed on Aug. 22, 2008.

(51) Int. Cl.
  *G06K 9/40*     (2006.01)

(52) U.S. Cl.
  USPC ............................. 382/261; 382/272; 382/282

(58) Field of Classification Search
  USPC ............... 348/222.1, 608; 382/128, 162, 164, 382/169, 254, 260, 261; 600/300
  See application file for complete search history.

(56) References Cited

U.S. PATENT DOCUMENTS

| | | |
|---|---|---|
| 4,720,871 A | 1/1988 | Chambers |
| 4,947,446 A | 8/1990 | Jutand |
| 5,168,375 A | 12/1992 | Reisch |
| 5,426,684 A | 6/1995 | Gaborski et al. |
| 5,432,893 A | 7/1995 | Blasubramanian et al. |
| 5,471,987 A | 12/1995 | Nakazawa et al. |
| 5,681,112 A | 10/1997 | Kuroda |
| 5,870,097 A | 2/1999 | Snyder et al. |
| 5,899,999 A | 5/1999 | Bonet |
| 6,034,690 A | 3/2000 | Gallery |
| 6,163,621 A | 12/2000 | Paik et al. |
| 6,347,153 B1 | 2/2002 | Triplett et al. |
| 6,826,311 B2 | 11/2004 | Wilt |
| 6,956,582 B2 | 10/2005 | Tidwell |
| 7,010,163 B1 | 3/2006 | Weiss |
| 7,031,543 B2 | 4/2006 | Cheng et al. |
| 7,072,528 B2 | 7/2006 | Han |
| 7,146,059 B1 | 12/2006 | Durand et al. |
| 7,239,756 B2 | 7/2007 | Sartor |
| 7,317,781 B2 | 1/2008 | Urushiya |
| 7,318,781 B2 | 1/2008 | Urushiya |
| 7,352,911 B2 * | 4/2008 | Maurer .......................... 382/260 |

(Continued)

OTHER PUBLICATIONS

Smith, S. M., and Brady, J. M., "SUSAN—a new approach to low level image processing," IJCV 23(1), pp. 45-78, 1997.*

(Continued)

*Primary Examiner* — Vikkram Bali
*Assistant Examiner* — Xuemei Chen
(74) *Attorney, Agent, or Firm* — Wolfe-SBMC (57) ABSTRACT

A system and method for a blur brush performing adaptive bilateral filtering is disclosed. The method may include receiving user input selecting an area of an image to be filtered, such as by pointing to the image area using the blur brush. The selected image may comprise an edge and a plurality of pixels. The method may operate to the blur brush identifying the edge in the selected image area. The method may operate to apply a filter tool (e.g., a bilateral filter) to the selected image area, while preserving the edge. The methods may be implemented by program instructions executing in parallel on CPU(s) or GPUs.

25 Claims, 6 Drawing Sheets

(56) References Cited

U.S. PATENT DOCUMENTS

| | | | |
|---|---|---|---|
| 7,426,312 B2* | 9/2008 | Dance et al. | 382/254 |
| 7,626,614 B1* | 12/2009 | Marcu | 348/222.1 |
| 7,783,121 B1 | 8/2010 | Cox | |
| 7,889,923 B1 | 2/2011 | Carr et al. | |
| 7,889,949 B2 | 2/2011 | Cohen et al. | |
| 7,920,739 B2* | 4/2011 | Chien et al. | 382/162 |
| 8,059,905 B1* | 11/2011 | Christian | 382/254 |
| 8,160,380 B2* | 4/2012 | Das Gupta et al. | 382/260 |
| 8,189,944 B1* | 5/2012 | Lim | 382/260 |
| 8,229,211 B2* | 7/2012 | Cherna et al. | 382/162 |
| 8,452,122 B2* | 5/2013 | Hitomi et al. | 382/275 |
| 8,594,445 B2 | 11/2013 | Cox | |
| 2003/0123749 A1 | 7/2003 | Cheng et al. | |
| 2003/0190090 A1 | 10/2003 | Beeman et al. | |
| 2004/0001643 A1 | 1/2004 | Thesen | |
| 2004/0254799 A1 | 12/2004 | Gallagher | |
| 2004/0264799 A1 | 12/2004 | Gallagher | |
| 2006/0034539 A1* | 2/2006 | Nachlieli et al. | 382/260 |
| 2006/0110063 A1 | 5/2006 | Weiss | |
| 2006/0147112 A1 | 7/2006 | Park et al. | |
| 2006/0153444 A1 | 7/2006 | Trimeche et al. | |
| 2007/0183682 A1 | 8/2007 | Weiss | |
| 2008/0144932 A1* | 6/2008 | Chien et al. | 382/169 |
| 2008/0175510 A1* | 7/2008 | Matsushita | 382/260 |
| 2008/0298680 A1 | 12/2008 | Miller et al. | |
| 2009/0317015 A1 | 12/2009 | Porikli | |
| 2010/0249532 A1* | 9/2010 | Maddess et al. | 600/300 |
| 2010/0310156 A1* | 12/2010 | De Haan et al. | 382/159 |
| 2010/0329546 A1* | 12/2010 | Smith | 382/164 |
| 2010/0329583 A1* | 12/2010 | Whiteside et al. | 382/260 |
| 2011/0033118 A1* | 2/2011 | Yildiz et al. | 382/199 |
| 2011/0135217 A1* | 6/2011 | Su et al. | 382/261 |
| 2011/0268328 A1* | 11/2011 | Bar-Aviv et al. | 382/128 |
| 2011/0273621 A1* | 11/2011 | Richardson et al. | 348/608 |
| 2013/0127894 A1 | 5/2013 | Cox | |

OTHER PUBLICATIONS

Sylvain Paris, et al., A Gentle Introduction to Bilateral Filter and its Applications, Aug. 27, 2007, 3 pages.

Jiawen Chen, et al., "Real-time Edge-Aware Image Processing with the Bilateral Grid," ACM Transactions on Graphics, vol. 26, No. 3, Article 103, Publication date: Jul. 2007, 10 pages.

Wikipedia, "Color Model," Jul. 25, 2008, 8 pages.

Wikipedia, "Color Model," Jun. 30, 2008, 7 pages.

"YCbCr," Wikipedia, Aug. 7, 2008, 7 pages.

Durand, et al., "Fast Bilateral filtering for the Display of High-Dynamic-Range Images," ACM Transactions on Graphics (TOG), Proceedings of the 29th Annual Conference on Computer Graphics and Interactive Techniques SIGGRAPH -02, vol. 21, Issue 3, 10 pages, 2002.

Hu, et al, "Multi-Scale Edge Detection with Bilateral Filtering in Apiral Archiecture," Proceedings of the Pan-Sydney area workshop on visual information processing VIP '05, Publisher: Australian Computer Society, Inc., 4 pages, 2005.

U.S. Appl. No. 12/323,009, filed Nov. 25, 2008.
U.S. Appl. No. 11/749,862, filed May 17, 2007.
U.S. Appl. No. 11/756,409, filed May 31, 2007.
U.S. Appl. No. 11/756,402, filed May 31, 2007.

Weiss, "Fast Median and Bilateral Filtering," ACM Transactions on Graphics, vol. 25, Issue 3, Jul. 2006, Proceedings of ACM SIGGRAPH 2006, pp. 519-526.

Paris, et al., "A Fast Approximation of the Bilateral Filter Using a Signal Processing Approach," Proceedings of the European Conference on Computer Vision, 2006.

Terdiman, "Radix Sort Revisited," 2000, http://www.codercorner.com/RadixSortRevisited.html.

Huang, "A Fast Two-Dimensional Median Filtering Algorithm," Acoustics, Speech, and Signal Processing [see also IEEE Transactions on Signal Processing], IEEE Transactions, vol. 27, Issue 1, Feb. 1979, pp. 13-18.

Huttunen, H. & Yli-Harja, O., "Fast Algorithm for Updating the Local Histogram of Multidemensional Signals,"Proceedings 1999 International Symposium on Nonlinear Theory and Its Applications (NOLTA '99), Hilton Waikoloa Village, Hawaii, USA, Nov. 28-Dec. 2, 1999, pp. 65-68.

Giovanni Garibotto, Livio Lambarelli, "Fast on-line Implementation of Two-Dimensional Median Filtering," Electronics Letters, vol. 15, No. 1, Jan. 4, 1979, pp. 24-25.

Williams, "Pyramidal Parametrics," Computer Graphics, vol. 17, No. 3, Jul. 1983, pp. 1-11.

Crow, "Summed-Area Tables for Texture Mapping," Computer Graphics, vol. 18, No. 3, Jul. 1984, pp. 207-212.

Tomasi, et al, Bilateral Filtering for Gray and Color Images Computer Vision, 1998, Sixth International Conference Jan. 4-7, 1998, pp. 839-846.

Ansar, et al., "Enhanced Real-Time Stereo Using Bilateral Filtering 3D Data Processing," Visualization and Transmission, 2004, 3DPVT 2004, Proceedings, 2nd International Symposium on Sep. 6-9, 2004, pp. 455-462.

U.S. Appl. No. 11/292,184, filed Nov. 29, 2005.

Fatih Porikli, "Constant time O(1) bilateral Filtering," Jul. 2008, Mitsubishi Electric Research Laboratories, Inc., 10 pages.

Ce Liu, et al., "Automatic Estimation and Removal of Noise from a Single Image," IEEE Transactions on Pattern Analysis and Machine Intelligence, vol. 30, No. 2, Feb. 2008, pp. 299-314.

"BPAI Decision ", U.S. Appl. No. 11/292,184 (Mar. 20, 2013), 6 pages.

"Non-Final Office Action", U.S. Appl. No. 12/323,009, (Feb. 1, 2012), 12 pages.

"Notice of Allowance", U.S. Appl. No. 12/323,0009, (Jul. 18, 2012), 7 pages.

Liu, et al., "Automatic Estimation and Removal of Noise from a Single Image", *IEEE Transactions on Pattern Analysis and Machine Intelligence*, vol. 30, No. 2, Feb. 2008, 16 pages.

Porikli, Faith "Constant Time O(1) Bilateral Filtering", *Mitusbishi Electric Research Laboratories, Inc.*, (Jul. 2008), 10 pages.

"Advisory Action", U.S. Appl. No. 11/292,184, (Sep. 10, 2009), 7 pages.

"Examiners Answer to Appeal Brier", U.S. Appl. No. 11/292,184, (Mar. 4, 2010), 22 pages.

"Final Office Action", U.S. Appl. No. 11/292,184, (May 7, 2009), 15 pages.

"Non-Final Office Action", U.S. Appl. No. 11/292,184, (Nov. 28, 2008), 15 pages.

"Notice of Panel Decision from Pre-Appeal Brief Review", U.S. Appl. No. 11/292,184, (Oct. 23, 2009), 2 pages.

"Notice of Allowance", U.S. Appl. No. 11/292,184, (Jul. 17, 2013), 8 pages.

* cited by examiner

ADAPTIVE BILATERAL BLUR BRUSH TOOL

This application claims benefit of priority to U.S. Provisional Application Ser. No. 61/091,223, filed Aug. 22, 2008, which is hereby incorporated by reference in its entirety.

BACKGROUND

1. Field of the Invention

The present invention is directed to computer systems. More particularly, it is directed to image processing.

2. Description of the Related Art

Image processing often involves the application of various filtering operations on image data using one or more convolution operations. For example, a median filter looks at pixel values (e.g., values indicating the color and/or intensity of the pixels in an image) within a box-shaped region around each pixel and selects the median value for the resulting image (i.e., the filtered output image.) In another example, a bilateral box filter replaces the value at a pixel, (i, j, k), with a weighted sum of the pixel values in the neighborhood of the pixel. Each weight is the product of a factor dependent on the distance (in pixels) to (i, j, k) and another factor dependent on the difference in intensity between the pixels and the pixel at (i, j, k).

SUMMARY

A system and method for a blur brush performing adaptive bilateral filtering is disclosed. The method may include receiving user input selecting an area of an image to be filtered, such as by pointing to the image area using the blur brush. The selected image may comprise one or more edges and a plurality of pixels. The user may be able to manually specify the tolerance (e.g., sensitivity to the edges), or an adaptive tolerance option may operate to determine the tolerance automatically. The method may operate to identify the one or more features (e.g., one or more edges, corners, dots, or other shapes with contrast) in the selected image area using the specified tolerance. The method may then apply a filter tool (e.g., a bilateral filter) to the selected image area while preserving features present in the image.

Thus the adaptive bilateral blur filter brush tool is operable to blur pixels in a selected area, and at the same time, keep any features, such as edges, in that area. For example, the blur brush may blur pixels that are not adjacent to any edges in the area affected by the blur brush. The features in the selected area may be identified using any feature or edge detection technique, including color difference between pixels. The user may specify the blur brush's tolerance for finding features manually. Alternatively, the blur brush may be operable to automatically determine tolerance for finding (i.e., distinguishing features or edges) based on the content of the selected area, so that features may be preserved correctly without the user manually adjusting the tolerance for each selected image portion. Thus the adaptive bilateral brush allows the user to remove noise, enhance the image, and/or amplify features or edges of selected regions of the image.

The methods described herein may be implemented by program instructions executable by one or more general-purpose processors (CPUs) and/or one or more graphics processing units (GPUs) in different embodiments. In some embodiments, the adaptive blur brush described herein may be generated by program instructions executing in parallel on one or more CPUs or GPUs configured for parallel execution. For example, calculating strength of a pixel relative to other pixels may be performed by different threads of an application executing on a CPU configured for multi-threaded execution, or by different GPUs configured to operate in parallel. Similarly, calculating tolerance(s) may be performed in parallel on a CPU configured for multi-threaded execution or by different GPUs configured to operate in parallel, in different embodiments. The methods disclosed herein may be implemented by program instructions comprised on one or more computer-readable storage media computer-executable by CPU(s) and/or GPU(s), in various embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various computer-implemented methods disclosed herein may be used to calculate the strength of pixels and/or applying a filter tool, such as the bilateral blur tool, for image processing. The methods may be implemented as part of a graphics application that supports various filtering techniques, such as median filtering and bilateral filtering. The techniques disclosed herein may be executed on graphics processing units (GPUs) and/or CPUs, in various embodiments. For example, a graphics application may include support for filtering to achieve blurring, anti-aliasing, blending, or other filtering operations that include applying a filter tool, such as an adaptive bilateral filter blur tool (referred to herein as a "brush tool"), as described herein.

Figure 1A:
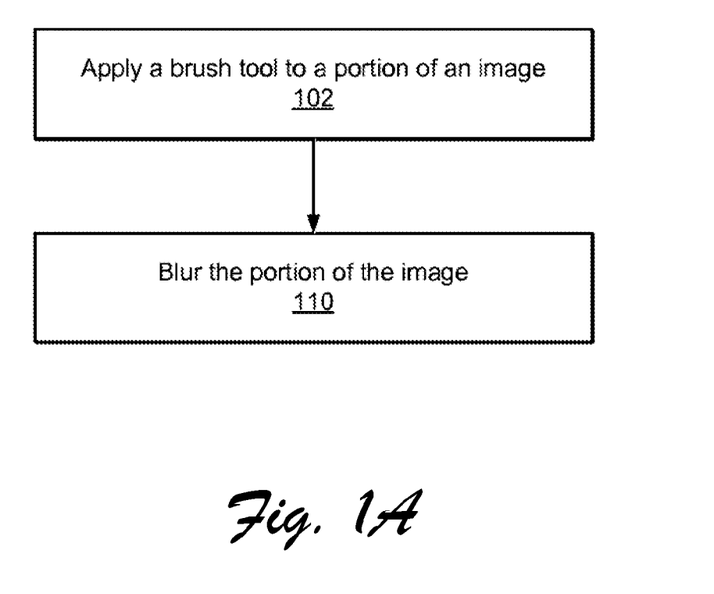
FIGS. 1A and 1B are flowcharts of an exemplary method for applying a filter tool, according to some embodiments.

FIG. 1A—Method of Applying a Filter Tool

FIG. 1A illustrates a method for applying an exemplary tool to an image, according to some embodiments. The method shown in FIG. 1A may be used in conjunction with any of the computer systems or devices shown in the other Figures, among other devices. In various embodiments, some of the method elements shown may be performed concurrently, in a different order than shown, or may be omitted. Additional method elements may also be performed as desired. As shown, this method may operate as follows.

In 102, a user may apply a tool (e.g., a brush tool) to an image. The image may be any type of a digital image that may be operated on by a user. In some embodiments, an application program may store the image and may allow the user to perform a variety of image processing operations on it, such as using a brush tool, a spray tool, and/or a variety of other tools. In some embodiments, the user may apply a different tool that operates to produce a similar and/or analogous result as described herein, such as a paint tool, a spray tool, or any other tool that can be manually applied by a user to select and operate on a portion of an image. Thus the user may use the tool to select a portion of an image to operate on.

In some embodiments, the brush tool (or another tool as described above), may have a fixed size that affects the selected portion of the image. In some embodiments, the user may change the size of the tool (e.g. the brush tool) as desired, such as resize the tool from an area of 3×3 pixels to an area of 7×9 pixels, or any other size; it is noted that the tool may be resized to a larger or a smaller size. In some embodiments, the size of the tool (e.g., the brush tool) may be selected automatically by the application program depending on the area of the image the user points to. The user may select and point the tool (e.g., the brush tool) to the image by using a mouse and/or some other pointing device (e.g., a trackball, a light pen, a tablet, and/or a touch-sensitive screen, among others).

In 110, the selected portion of the image (referred to herein as the "selected image area") may be blurred. Specifically, the tool (e.g., the brush tool) may operate to blur the image substantially contained in the selected area, while leaving any features intact. The tool may thus find one or more features in the selected area of the image (as described below), and only blur the pixels that are not contained in the one or more found features. A feature may be any shape or image-portion having contrast relative to other portions of the selected area. The amount of contrast may be specified and/or configurable. A feature may be one or more edges, corners, dots, or other shapes with contrast. Although a feature is not limited to any particular shape, for ease of description an edge is used as an example of a feature throughout the remainder of this description. However, the description is intended to apply to any type of feature, not just edges. In some embodiments, the tool may operate on the image substantially instantaneously, meaning that the selected area of the image may display the results of the blur operation substantially instantaneously (i.e., in real-time) after the user initiates the blur operation using the tool. Substantially instantaneously or substantially in real-time means within the processing speed limitations of a computer or other specific apparatus implementing the embodiment, as would be understood by those in the computer arts. Thus the user can operate only on a small (e.g., defined by the area of the image affected by the tool) area of the overall image using the tool, and the tool may show results of the blur operation in real-time, thus giving the user flexibility in applying image processing operations on the image.

Figure 1B:
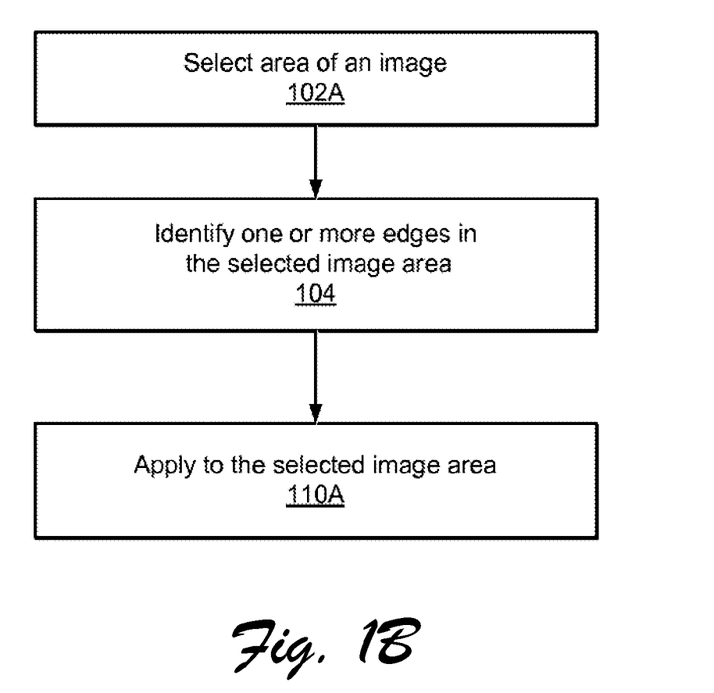

FIG. 1B—Detailed Method of Applying a Filter Tool

FIG. 1B illustrates a more detailed method for applying an exemplary tool to an image, according to some embodiments. The method shown in FIG. 1B may be used in conjunction with any of the computer systems or devices shown in the other Figures, among other devices. In various embodiments, some of the method elements shown may be performed concurrently, in a different order than shown, or may be omitted. Additional method elements may also be performed as desired. As shown, this method may operate as follows.

In 102A, the method may receive input selecting an area of an image. For example, a user may select an area of an image, such as by applying a tool (e.g., a brush tool) to an image. The tool may operate on the image by selecting a predetermined area of an image, such as a 3×3 pixel square. The tool may be used to perform signal processing (e.g., filtering) on the selected area of the image, while leaving the rest of the unselected image unchanged.

Thus in 102A, an input, such as a user input, may be received that selects an area of an image (such as image 300 of FIG. 3A) using a tool. The image may contain pixels A1-A10, B1-B10 . . . G1-G10. The selected image 330 area includes a plurality of pixels such as pixels E1-E3, F1-F3, G1-G3 of FIG. 3A. The plurality of pixels in the selected image 330 area may include one or more potential edges, such as a potential edge 320B marked by pixels E1, F2, and G3.

In 104, the tool may identify one or more edges in the selected image area 330. The tool may use any number of techniques to detect edges in the selected image area 330. It is understood that the tool may not necessarily perform edge detection by itself, i.e., it may pass the selected area to another tool, function, and/or application for analysis/filtering, and/or the tool/application program may call/invoke another tool, function, and/or application for analysis. In other words, the tool may detect the one or more potential edges, such as the edge 320B, in the selected image area 330 to obtain one or more detected edges. Thus the potential edge 320B may be detected as a detected edge 320B.

In 110A, a filter (e.g., a blur filter) may be applied to the selected image area. The tool may operate to apply the filter, e.g., a blur filter, to the pixels in the selected area of the image while preserving the one or more edges identified in 104. In some embodiments, the identification of the edges and the application of the filter may be done in one operation. In other words, the method may apply a filter to the selected image area 330 to filter (e.g., blur) the plurality of pixels in the selected image area 330 while preserving the one or more detected edges, such as the detected edge 320B. Note that detecting an edge may be implicit and does not require any explicit stored classification of the edge. That is, the method or algorithm need not explicitly decide what is to be preserved. Instead, a continuum between variations to be smoothed and variations to be preserved may exist. The contrast of a feature or edge decides where it is on this continuum.

Figure 2:
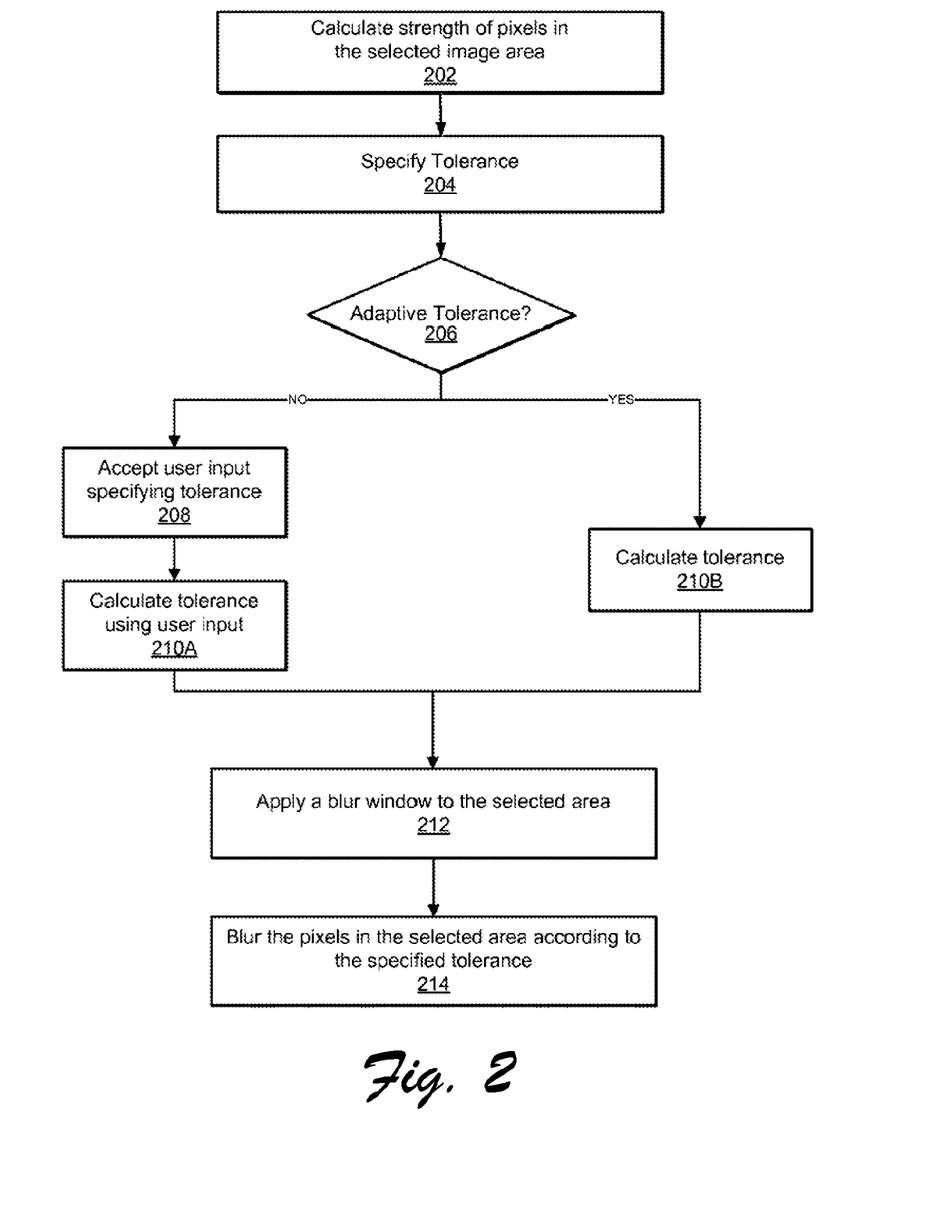
FIG. 2 is a flowchart illustrating a method of applying an adaptive filter tool, according to some embodiments.

FIG. 2—Method for Applying an Adaptive Filter Tool

FIG. 2 illustrates an exemplary method of operation of an exemplary filter tool, such as a blur filter brush tool, according to some embodiments. FIG. 2 illustrates the operation of one or more of the elements 102, 102A, 104 110, and/or 110A of FIGS. 1A and 1B. For example, FIG. 2 illustrates the operation of element 110 of FIG. 1A and/or operation of elements 104 and 110A of FIG. 1B.

Figure 3A:
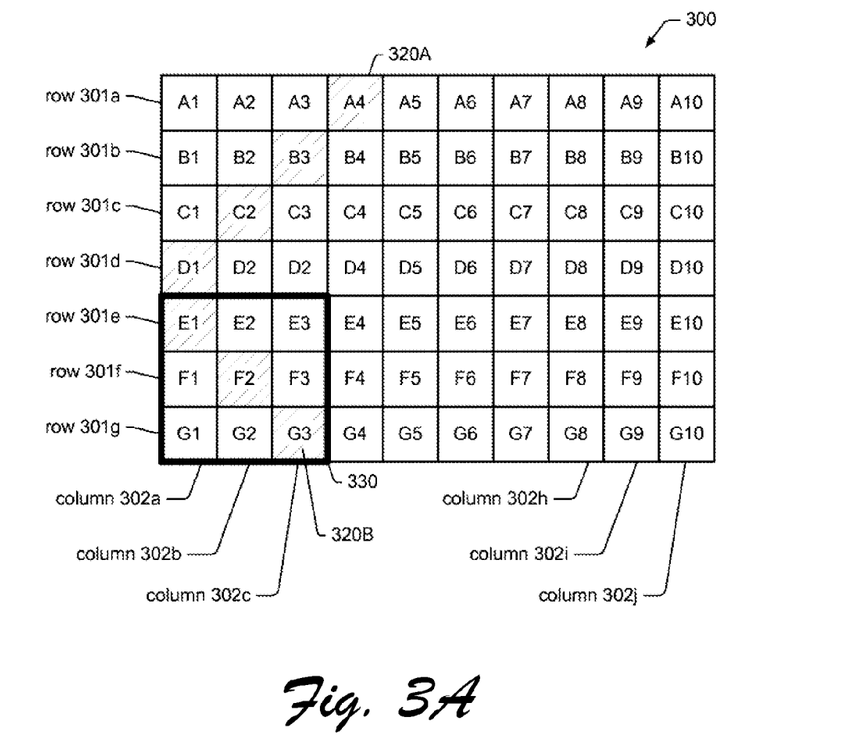
FIG. 3 illustrates an exemplary image that can be operated on using the filter tool, according to some embodiments.
Figure 3B:
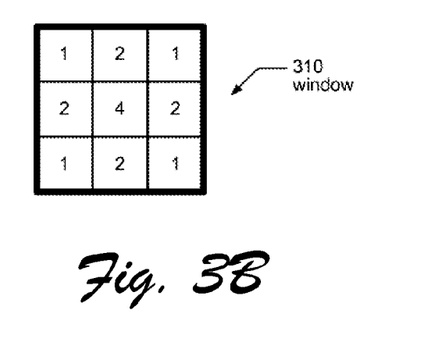
FIGS. 3B and 3C illustrate exemplary filter windows that may be applied using the filter tool, according to some embodiments.
Figure 3C:
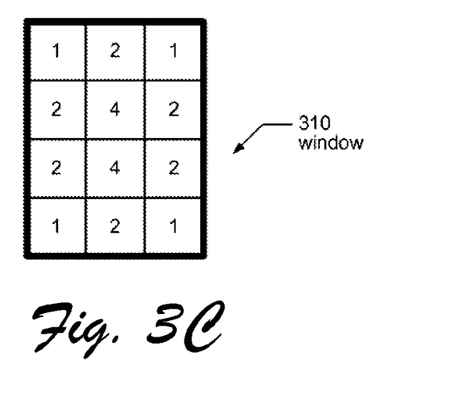

The tool may operate on the selected image area, such as ones shown in FIGS. 3B-C. Each pixel in the image, and thus in the selected image area, may have associated color channels of a respective color space. For example, when using the Red, Green, and Blue (RGB) color space, each pixel may have one or more associated RBG values (such as one value for each of the R, G, and B color channels). In some embodiments more than one color space may be used for one or more of the pixels in the image and/or in the selected image area.

The one or more color spaces may include the Hue, Saturation, and Value (HSV) color space, the Lab Color Space (CIELAB), the International Commission on Illumination 1931 XYZ color space (CIEXYZ), any of the variants of the CIE XYZ color space, the RGB Alpha (RGBA) color space, any of the variants of the Cyan, Magenta, Yellow, and Key (CMYK) color space, the YIQ (luma/luminance, in-phase, and quadrature components) color space, the YPbPr color space, any of the variants of YUV (luma/luminance and two chrominance color components) color space, any of the variants of the YCC (luma/luminance and chroma components) color space, the Hue, Saturation, and Brightness (HSB) color space, the Hue, Saturation, and Lightness/Luminance (HSL) color space, the Munsell color system, the Natural Color System (NCS), the RG Chromaticity color space, the color space used by the Human Visual System Model (HVS), and/or any other color space system used to denote color values of pixels in an image.

Thus in some embodiments, the pixels may be initially described using the RBG color space, and then be converted to the YCC color space. In some embodiments, pixels that use the RBG color space may be converted to use another color space listed above. In some embodiments, the pixels in the RGB color space may be operated on directly, i.e., without converting to any other color space. In case of using the RGB color space directly, calculations in each of the R, G, and B channels may be performed in order to properly calculate pixel strength.

In some embodiments, when using the YCC color space, the method may use the Y channel of one or more pixels to determine if a first pixel is similar to a second pixel. The Y channel may contain luma and/or luminance information for a pixel. The Y channel may describe the pixel intensity by its luminance instead of its individual RGB values. In some embodiments, other channels of other color spaces may be used to differentiate pixels between each other. For example, the L channel of the HSL color space may be used, or the Y' (luma instead of Y luminance) of the YCC color space, or the Y channel of the YIQ, or the Y channel of the YUV, or any other channel and/or combination of channels.

In some embodiments, the RGB color space may be used directly, such as by examining each of the R, G, and B channels separately for each pixel. For example, if a certain pixel has a similar R channel as another pixel, but have different G and B channels, the filter may blur the R channel only, which may result in a visual artifact. Therefore, multiple calculations that account for all three channels (i.e., R, G, and B) may be used. In other color spaces, use of only two of the channels of a given color space may be sufficient.

In 202, the method may operate to calculate color distribution of pixels in the selected image area. In some embodiments, the calculation may include performing a standard deviation operation that show the color distribution of pixels in the selected image area, such as by calculating a mean value for a color channel. In some embodiments, other calculations may be performed in addition to, or instead of, the standard deviation calculation, such as variance, mean, median, and/or other statistical and image processing analysis on the pixels in the selected image area. The calculations may be performed to calculate adaptive tolerance, as described below.

For example, in order to calculate standard deviation, the following calculations may be performed. The calculations may comprise calculating three or more accumulation variables, such as the summation of the square of each element, the summation of each element, and the number of elements. For each pixel within the selected image area, the Y value may be calculated and may be accumulated within each of the summation calculations. As mentioned above, other channel(s) of other color spaces may be used instead, or in addition to, using the Y channel. Next, the squared elements may be summed, subtracted by two times the summation of the elements multiplied by the mean, which then may be added to the number of elements multiplied by the square of the mean. The final summation may be divided by the number of pixels affected (i.e., in the selected image area). The standard deviation may be equal to the square-root of the final summation.

In some embodiments, the following code may be used to implement the standard deviation calculations. The following code is exemplary only, and other implementations may be used instead of, or in addition to, this example. In some embodiments, as mentioned above, other calculations may be used in addition to, or instead of, the standard deviation calculation. Additionally, in some embodiments, the method may use a different edge detection technique than the one described in this example.

```
for (x = start; x < end; x += 1) {
    for (y = start; y < end; y += 1) {
        squaredsummation += [Y value of pixel (x,y)] *
            [Y value of pixel (x,y)];
        summation += [Y value of pixel (x,y)];
        numberofpixels += 1;
    }
}
mean = summation / numberofpixels;
variance = squaredsummation − 2 * (summation) *(mean) +
    (numberofpixels) * (mean) *(mean);
variance = variance / numberofpixels;
(Standard Deviation) = squarerootof (variance);
```

In 204, the method may receive input specifying type and/or value for tolerance. In some embodiments, the type of tolerance may be chosen automatically by the application. As described below, the types of tolerance include adaptive tolerance, user-specified tolerance, or a combination of the two, as described below. Also, the user may be able to input the amount of tolerance for the tool, such as initial tolerance or value of manual tolerance.

Figure 4:
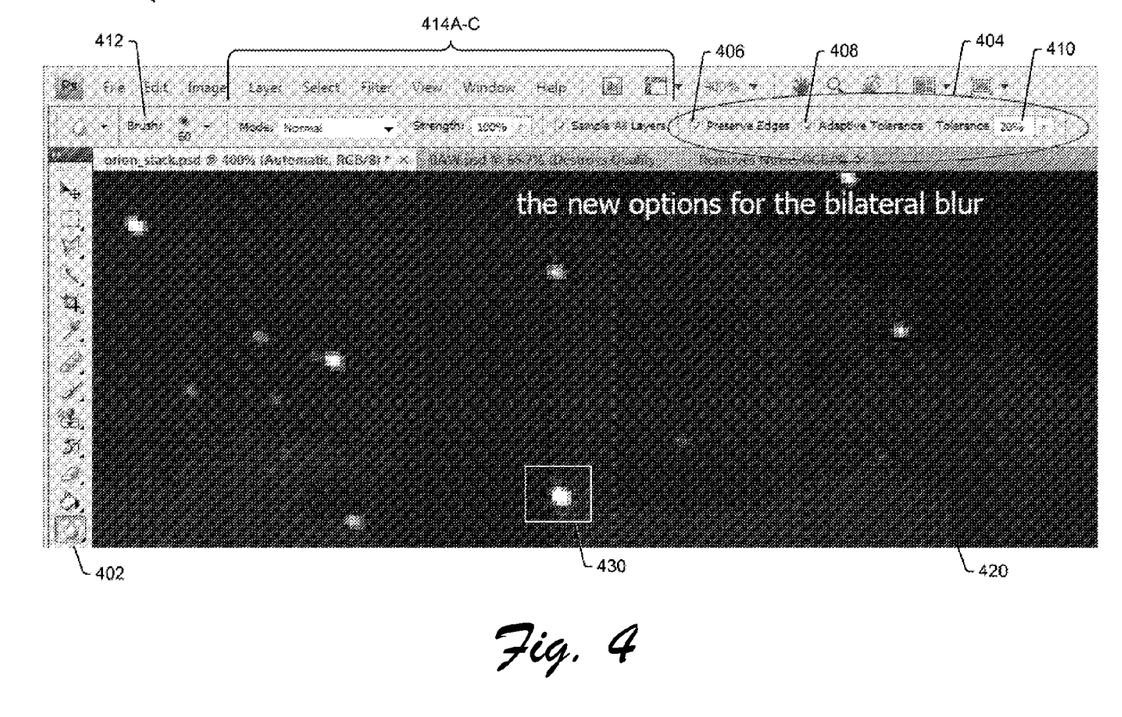
FIG. 4 is an exemplary screenshot of an exemplary image processing application that may use the filter tool, according to some embodiments.

In 206, the method may decide whether to use adaptive tolerance or user-specified tolerance, such as based on the input of element 204. Tolerance may define how susceptible color differences of two pixels can affect each other. For example, when there is a higher tolerance, even with high color differences, the two pixels may affect each other in the filter operation (e.g., a blur filter). When there is a lower tolerance, even with a little color difference, the two pixels may not affect each other. For example, as illustrated in FIG. 4, in some embodiments the user may select the "Adaptive Tolerance" option for the tool (e.g., a brush tool). In some embodiments, the selection of the automatic adaptive tolerance option may operate to automatically determine the tolerance for finding/detecting edges in the selected image area.

In 208, in some embodiments, if manual tolerance is selected, the application (e.g., the image processing application) may accept user input specifying manual tolerance as a value for tolerance threshold. In some embodiments, the manual tolerance may be selected when a user disables the adaptive tolerance option, but an explicit selection of manual tolerance is contemplated. In some embodiments, the application may suggest an automatic tolerance value to the user, who then may use the automatic tolerance (e.g., calculated using the adaptive tolerance option), or may manually override the adaptive tolerance suggestion and enter own value for the tolerance threshold.

In some embodiments, the actual tolerance used by the application may be substantially equal to the user-input tolerance (e.g., in percentage from 0 to 100) multiplied by the maximum Y channel value (e.g. in an 8-bit case, the maximum Y channel value is 255). In some embodiments, the user-input tolerance may use another scale, such as 0-10, 0-255, 0-1000, or any other scale. In some embodiments, the user-input tolerance may be directly used without scaling by the maximum Y channel value. In some embodiments, the user-input tolerance may be scaled using another channel, such as when the application uses a different color space and/or the RGB values directly. As noted above, if the RGB color space is used directly, the calculations may be repeated for two or more channels of the RGB color space for a respective pixel.

In some embodiments, the user may use a graphical user interface (GUI) to select the desired tolerance and/or threshold values. The GUI may provide the user with a separate window where the user can experiment with the tolerance values until a desired tolerance is found. An example of a GUI is shown in element 404 of FIG. 4, but other implementations are contemplated. In addition, the application program may operate to display a preview of both how the filtered portion of the image would look like using the user-selected tolerance versus by using the adaptive tolerance option, such as to compare and contrast the results of the filtering operation.

In 210B, if the adaptive tolerance option is selected, a value for tolerance threshold (also referred to herein as simply "tolerance" or "tolerance value") may be calculated automatically. In some embodiments, as illustrated in FIG. 4, the user may select the "Adaptive Tolerance" option for the tool (e.g., a brush tool). In some embodiments, the selection of the automatic adaptive tolerance option may operate to automatically determine the tolerance for finding/detecting edges in the selected image area. In some embodiments, the adaptive tolerance option may operate to calculate a starting value for the analysis based on the content of the selected image area, in which case the starting value would be considered "adaptive tolerance" as used below. In some embodiments, the adaptive tolerance option may operate to use a user-entered starting value for the tolerance as basis for calculations, in which case the "adaptive tolerance" would be calculated as described below.

In other words, the adaptive tolerance may adjust the tolerance depending on the strength of the pixels contained in the selected image area. Thus, the tolerance threshold may be adjusted up if the potential edges are easily detectable. Analogously, the tolerance threshold may be adjusted down if the potential edges are not easily detectable. The adaptive tolerance may check the value of a color channel of each pixel in the selected image area and compare it to the center pixel. If that difference is greater than the threshold value then the weight of that pixel may be zero. However, if the pixel being tested should be counted as a part of a potential edge, then the threshold value may need to be adjusted in order to detect the potential edge running through that pixel.

Thus in some embodiments, adaptive tolerance may use the user-input tolerance, such as the starting value, (e.g., in percentage from 0 to 100) multiplied by the maximum Y channel value (e.g., in an 8-bit case, the maximum Y channel value is 255) to yield the value of adaptive tolerance. In some embodiments, the user-input tolerance (e.g., the starting value) may use another scale, such as 0-10, 0-255, 0-1000, or any other scale. In some embodiments, the user-input tolerance (e.g., the starting value) may be directly used without scaling by the maxim Y channel value. In some embodiments, the user-input tolerance (e.g., the starting value) may be scaled using another channel, such as when the application uses a different color space and/or the RGB values directly. As noted above, if the RGB color space is used directly, the calculations may be repeated for the other channels of the RGB color space for a respective pixel.

Thus for the adaptive tolerance option, the actual tolerance may be equal to the adaptive tolerance multiplied by a coefficient defined by the standard deviation. As mentioned above, the value of the adaptive tolerance may be calculated either automatically, or by using a user-entered initial tolerance value. In some embodiments, the actual tolerance (e.g., the threshold variable) may be calculated as follows:

```
threshold = (user % threshold input) * coefficient * (maximum Y
channel number);
    coefficient = 2 * [(Standard Deviation) / (maximum Y channel
number)];
```

In some embodiments, if the selected image area has a strong edge (e.g., an edge that is easily discernible from the rest of the image), the value of the standard deviation may be large (e.g., for the Y channel value or any other channel used in the calculations). Thus for strong edges, the threshold may have a larger relative value. As a result, the strong edge may be easily identified, and thus untouched during the filtering process (e.g., application of the blur filter).

On the other hand, if the selected image area has a weak and/or a blurred edge, the standard deviation for the selected image area may have a small relative value (e.g., for the Y channel value or any other channel used in the calculations). Therefore, the threshold value may be relatively smaller, such that the tool may detect and thus not disturb any weak edges that are present in the selected image area.

In some embodiments, the coefficient may be multiplied by a constant, such as by two if the strongest edge has a standard deviation of half of the maximum number (e.g. if 100 is the maximum value, the average of 0 and 100 is 50 and has a standard deviation 50, which is half the maximum value). In some embodiments, different maximum values may be used instead. In some embodiments, the threshold value may be approximately similar to the input (e.g., the coefficient may be close to the value of one).

In 212, a filtering window may be applied to the selected image area. For example, if the tool is a blur brush, a blur window may be applied to the selected image area. In some embodiments, a different filter may be applied that uses the edge determination in the selected image area. For example, the filter window may operate to perform a diffusion operation, airbrush, fill, stamp operation, and/or gradient operation, among others. In some embodiments, if the tool is a blur brush, the blur window (example of a filtering window) may operate to blur the selected image area while preserving the integrity of the edges. Thus the actual tolerance may be used in the application of the filtering window. In some embodiments, the filtering window may be applied almost instantaneously, e.g., after the user clicks on and/or activates the tool selecting the image area, thus giving the user a real-time visual feedback on the operation of the tool on the selected image area.

In some embodiments, the method may examine most or all of the pixels in the selected image area and apply the filtering window to these pixels. For example, the method may operate to blur each pixel with the actual tolerance as calculated in 210A/B. In some embodiments, for each pixel within the selected image area, a three by three filter window (e.g., a blur window) may be applied. An exemplary 3 by 3 pixel filter window is shown in FIG. 3B. In some embodiments, a filter window of different size may be used, such as a 3 by 4 pixel filter window of FIG. 3C, or any other size.

In some embodiments, the selected image area and the filter window (e.g., the blur window) may be substantially the same. Thus, the tool (e.g., a blur brush tool) may select a portion of the image (e.g., an image as shown in FIG. 3A) to yield a selected image portion (e.g., a 3 by 3 pixel area), on which the filter window of FIG. 3B (e.g., the blur filter) may be applied. A small filter window may be used to allow the tool (e.g., the brush tool) to be fast and provide the user with desired control. However, in some applications, a bigger filter window may be preferred instead. In some embodiments, the size of the tool and/or the filter window may be determined by the user. In some embodiments, the size of the tool and/or the filter window may be the same.

The method may use two or more coefficients for each pixel in the filter window to calculate the final output blur value, such as a spatial weight coefficient and/or a color range weight coefficient. In some embodiments, only one of the spatial weight and the color range weight coefficient may be used. In some embodiments, additional coefficients may be used in addition to, or instead of, the spatial weight and the color range weight coefficients. Pixels in the filter window may have spatial weight coefficients as shown in the exemplary 3 by 3 filter window of FIG. 3B, e.g., the center pixel may have a spatial weight coefficient of 4, whereas the corner pixels may have a spatial weight coefficient of 1. It is noted that the spatial weight coefficients are exemplary only, and other values are contemplated.

Spatial weight coefficients may be determined by using Gaussian distribution, or any other statistical/probability distribution, such as the continuous uniform distribution, Beta distribution, or the Gamma distribution. For example, the center pixel may have the largest weight assigned to it, and as pixels deviate from the center, their weight may be smaller. Thus as the strength parameter decreases relative to the other coefficients (e.g., becomes 1), the value of the center spatial weight coefficient may be increased, thus making the blur weaker.

The color range weight may be substantially similar to the actual tolerance calculated in step 210A/B. For example, as the Y channel value of a certain pixel in the filter window deviates from the Y channel value of the center pixel, the weight for that pixel may be decreased. Thus the filter may also use the center pixel of the filter window to calculate a color range weight coefficient.

In some embodiments, the output value of the center pixel may be calculated by a summation of the pixel values multiplied by the two coefficients divided by the normalization factor, which may be the summation of the two coefficients. As mentioned, if different and/or additional coefficients are used, the pixel values may be multiplied by the different and/or additional coefficients and divided by a summation of the different and/or additional coefficients.

In some embodiments, the following exemplary code may be used to calculate the blur for each pixel.

```
for ( each pixel (x,y) in the affected region ) {
    Y channel value of center (x,y) pixel is calculated;
    for ( each pixel (i,j) in the blur window ) {
        reset Summations and Normalization;
        Y channel value of the (i,j) pixel is calculated;
        spatial weight = (depends on the (i,j) indicated in the spatial weight
        coefficients above);
        color-range weight = [1−(Y of (i,j) − Y of (x,y))/tolerance]; //if the Y
        differences exceed tolerance, the weight = 0
        SummationRed += (spatial weight) * (color-range weight) * Red
        channel value of (i,j);
        SummationBlue += (spatial weight) * (color-range weight) * Blue
        channel value of (i,j);
        SummationGreen += (spatial weight) * (color-range weight) * Green
        channel value of (i,j);
        Normalization += (spatial weight) * (color-range weight);
    }
    Red Output of (x,y) pixel = SummationRed/Normalization;
    Blue Output of (x,y) pixel = SummationBlue/Normalization;
    Green Output of (x,y) pixel = SummationGreen/Normalization;
}
```

Thus in some embodiments, the method may perform two or more passes through most or all of the pixels in an area selected by a tool. A first pass may determine the strength of the pixels present in the selected image area (such as by calculating the standard deviation of the area affected by the tool, i.e., the selected image area). Next, the method may calculate the actual tolerance for the selected image area using the calculated strength of the pixels. A second pass through most or all of the pixels in the selected image area may be used to determine the blur value for the pixels in the selected image area. The second pass may operate to parse through most or all of the pixels in the selected image area and apply the tool filter to each pixel using the actual tolerance calculated above. For example, the second pass may parse through most or all of the pixels in the selected image area and blur each pixel using the actual tolerance. In other words, the method may apply an adaptive bilateral filter that operates to blur the pixels in the selected image area. The adaptive bilateral filter may be able to determine, for each image area selected by the user, the tolerance that may be able to detect edges in that selected image. As a result, the user can blur the pixels in the selected image without blurring the edges.

FIG. 3—Exemplary Image

FIG. 3 is an exemplary image on which the tool (such as the blur brush tool) may operate. For example, a tool may select an image portion of the image 300 in accordance with the methods described below in FIGS. 1A, 1B, and 2. The image 300 may contain one or more edges, such as edges 320A and 320B. The tool may apply a window 310 to select the image portion 330. The selected image portion 330 may contain an edge 320B. The tool may apply a filter to the selected image portion, which may operate to blur the pixels in the selected image portion while preserving the edge 320B. The tool may apply the filter using a filter window 310, such as described below with reference to FIGS. 3B and 3C.

FIGS. 3B and 3C—Exemplary Filter Windows

FIGS. 3B and 3C illustrate exemplary filter windows that may be applied by a tool to select and/or operate on a selected image portion. For example, a tool may select an image portion of the image 300 in accordance with the methods described below in FIGS. 1A, 1B, and 2. The tool may then apply a filter window, such as the filter window of FIG. 3B or 3C to the selected image portion. In some embodiments, the filter window may be substantially the same as the selected image portion. In some embodiments, the filter window may be smaller than the selected image portion, and the filter window may be moved around the selected image portion until the entire selected image portion was filtered.

Thus in some embodiments, for each pixel within the selected image area, a three by three filter window (e.g., a blur window) may be applied. An exemplary 3 by 3 pixel filter window is shown in FIG. 3B. In some embodiments, a filter window of different size may be used, such as a 3 by 4 pixel filter window of FIG. 3C, or any other size. As shown, each pixel in the filter window may have associated spatial weight/color range coefficients. The use of these coefficients is described above with reference to FIG. 2.

FIG. 4—Exemplary Screenshot of an Image Processing Application

FIG. 4 is an exemplary screenshot of an exemplary image processing application 400 that may comprise one or more tools able to select and operate on an image portion. FIG. 4 illustrates an exemplary graphical user interface (GUI) that may give a user an easy way to configure and apply the tool to the image. The tool may select a portion of the image 420 to select a selected image portion 430. The tool may operate on the selected image portion in accordance with the methods described below in FIGS. 1A, 1B, and 2.

For example, a user may select any of the tools on the left hand side of the application window 412 (e.g., a brush tool). The brush tool 412 may offer various options to the user. For example, the application 400 may present the following choices for the brush tool 412—mode, strength, and ability to sample all layers 414A-C, preserving edges 406, use of adaptive tolerance 408, and tolerance value 410. The selection of tolerance value 410 may be a value of the initial tolerance or of manually input tolerance (such as described above with reference to FIG. 2).

Figure 5:
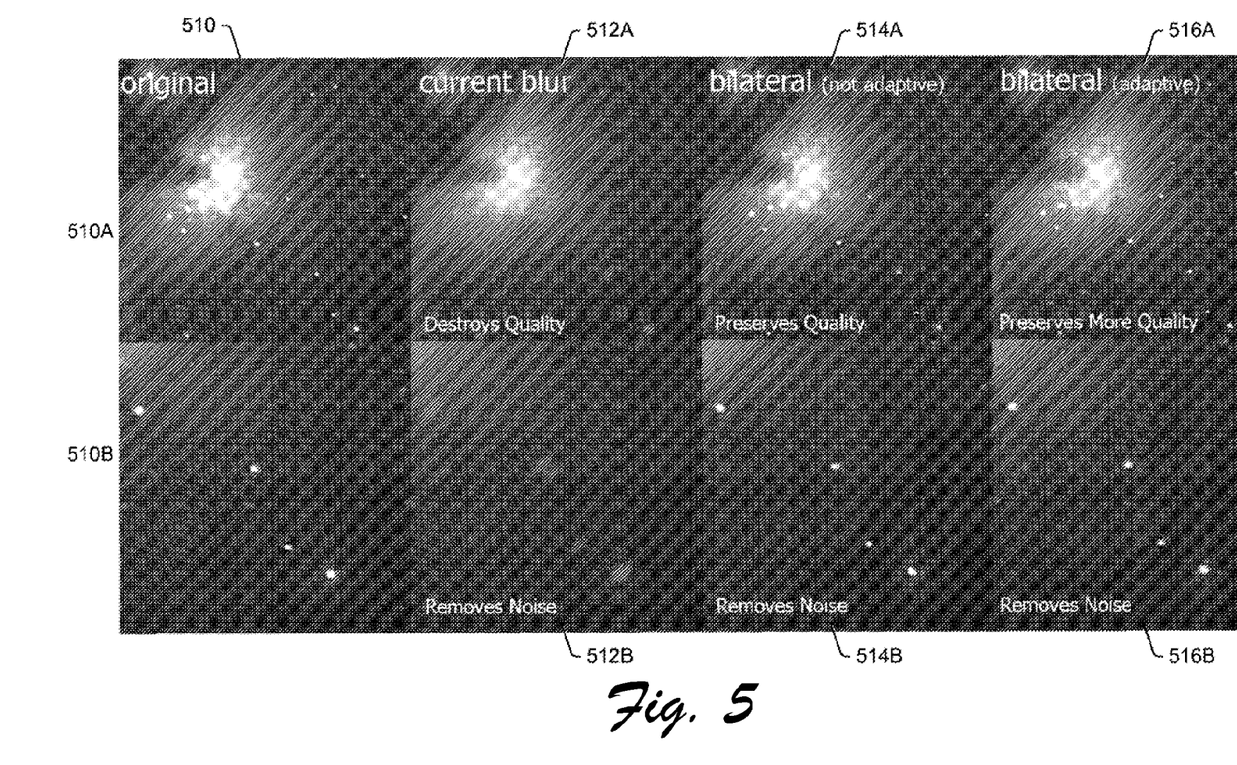
FIG. 5 is a collection of exemplary screenshots of results of using an exemplary filter tool, according to some embodiments.

FIG. 5—Exemplary Results of the Filter Tool

FIG. 5 shows exemplary screenshots of various filter tools applied to one or more selected image areas. It is noted that the screenshots of FIG. 5 do not necessarily correspond to results of a single application of the tool, but rather may reflect multiple applications of the tool to a larger portion of an image.

FIG. 5 shows an exemplary collage of images 500 that has been processed by various tools. For example, an original image is shown in portion 510A, and detail of a portion of the original image is shown in portion 510B. An operation by a regular blur tool may result in an image shown in section 512A. As shown, the use of the regular blur tool may result in degradation of the quality of the image, such as destruction of edges, as shown in more detail in the magnification of section 512B. Results of an exemplary operation by a bilateral blur tool without using adaptive tolerance is shown in section 514A. As shown by the magnification of section 514B, the use of the bilateral blur tool preserves some quality, such as edges contained in the image. An operation by a bilateral blur tool with the use of adaptive tolerance is shown in section 516A. As shown, the use of the adaptive bilateral blur tool preserves more quality, such as edges contained in the image, as the magnification of section 516B illustrates.

Figure 6:
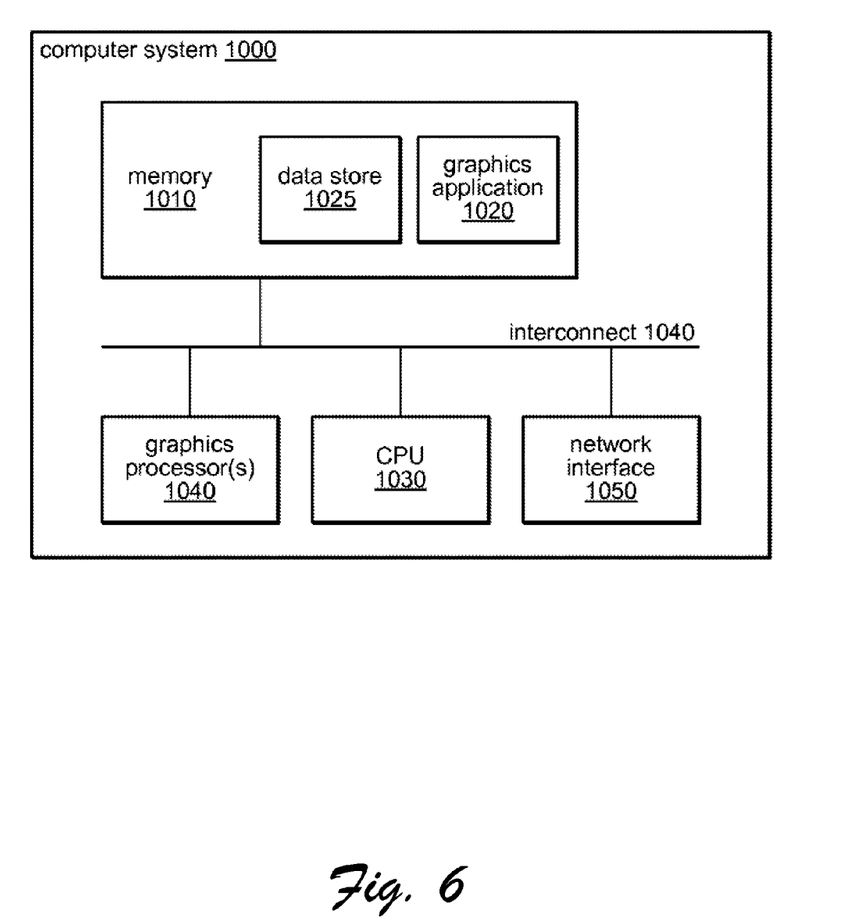
FIG. 6 is an block diagram of an exemplary computer system that can implement the use of the filter tool, according to some embodiments.

FIG. 6—Exemplary Computer System

FIG. 6 is a block diagram illustrating one embodiment of a computer system 1000 suitable for implementing the methods for use of a filtering tool, such as a blur brush tool, described herein. A computer system 1000 may include a processor unit (CPU) 1030 (possibly including multiple processors, a single threaded processor, a multi-threaded processor, a multi-core processor, or other type of processor). The computer system 1000 may also include one or more system memories 1010 (e.g., one or more of cache, SRAM DRAM, RDRAM, EDO RAM, DDR RAM, SDRAM, Rambus RAM, EEPROM, or other memory type), an interconnect 1040 (e.g., a system bus, LDT, PCI, ISA, or other bus type), and a network interface 1050 (e.g., an ATM interface, an Ethernet interface, a Frame Relay interface, or other interface). The memory medium 1010 may include other types of memory as well, or combinations thereof. The CPU 1030, the network interface 1050, and the memory 1010 may be coupled to the interconnect 1040. It should also be noted that one or more components of system 1000 might be located remotely and accessed via a network. One or more of the memories 1010 may embody a graphics application 1020.

A graphics application such as graphics application 1020 may be configured to calculate the strength of pixels and/or apply the bilateral blur tool. Graphics application 1020 may represent various types of graphics applications, such as painting, publishing, photography, games, animation, and other applications. Additionally, graphics application 1020 may utilize a graphics processor 1040 when rendering, displaying, or operating on the images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1040 may implement a number of graphics primitive operations in a way that makes executing them much faster than drawing directly to the screen with a host central processing unit (CPU), such as CPU 1030.

As described above, the methods disclosed herein for calculating the strength of pixels and/or applying the bilateral blur tool may be implemented by program instructions configured for parallel execution on two or more such GPUs.

Please note that functionality and/or features described herein as being part of, or performed by, graphics application 1020 may, in some embodiments, be part of, or performed by, one or more graphics processors, such as graphics processor 1040. As described above, in some embodiments graphics application 1020 may be configured to render altered images into a separate image layer or separate layered window than input images.

Calculating the strength of pixels and/or applying the bilateral blur tool, as described herein, may be implemented on various types of computer systems. Referring again to FIG. 6, computer system 1000 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 1020 described herein may be provided as a computer program product, or software, that may include a computer-readable storage medium having stored thereon instructions, which may be used to program a computer system (or other electronic devices) to implement the methods described herein. A computer-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

In some embodiments, memory 1010 may include program instructions configured to implement graphics application 1020, as described herein. Graphics application 1020 may be implemented in any of various programming languages or methods. For example, in one embodiment, graphics application 1020 may be JAVA based, while in another embodiments, it may be implemented using the C or C++ programming languages. In other embodiments, graphics application 1020 may be implemented using specific graphic languages specifically for developing programs executed by specialize graphics hardware, such as GPU 1040. In addition, graphics application 1020 may be embodied on memory specifically allocated for use by graphics processor(s) 1040, such as memory on a graphics board including graphics processor(s) 1040. Thus, memory 1010 may represent dedicated graphics memory as well as general-purpose system RAM.

Memory 1010 may in some embodiments also include a data store 1025. Data store 1025 may be configured to store image data for one or more input images and/or filtered output images, in various embodiments. Data store 1025 may also be configured to store various information related to calculating the strength of pixels and/or applying the bilateral blur tool, in some embodiments. Information stored in data store 1025 may be organized in any of various data structures, such as in one or more tables, databases, or arrays, and/or may be included in one or more files of any suitable computer-readable format, in various embodiments. Other information not described herein may be included in memory 1010 and/or data store 1025 and may be used to implement the methods described herein and/or other functionality of computer system 1000.

Network interface 1040 may be configured to enable computer system 1000 to communicate with other computers, systems or machines, such as across network 100, described above. Network interface 1040 may use standard communications technologies and/or protocols. Network 100 may include, and network interface 1040 may utilize, links using technologies such as Ethernet, 802.11, integrated services digital network (ISDN), digital subscriber line (DSL), and asynchronous transfer mode (ATM) as well as other communications technologies.

Similarly, the networking protocols used on network 100 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 100 by network interface 1040 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1040 may be implemented in a number of different physical forms. For example, GPU 1040 may take the form of a dedicated graphics card, an integrated graphics solution and/or a hybrid solution. GPU 1040 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 6, memory 1010 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth.

Hybrid solutions also share memory with the system memory, but have a smaller amount of memory on-board than discrete or dedicated graphics cards to make up for the high latency of system RAM. Data communicated between the graphics processing unit and the rest of the computer may travel through the graphics card slot or other interface, such as interconnect 1040 of FIG. 6.

While graphics application 1020, which may implement calculating the strength of pixels and/or applying the tool, such as the bilateral blur tool, has been described herein with reference to various embodiments, it will be understood that these embodiments are illustrative and that the scope of the present invention is not limited to them. Many variations, modifications, additions, and improvements are possible. More generally, the present invention is described in the context of particular embodiments. For example, the blocks and logic units identified in the description are for ease of understanding and not meant to limit the invention to any particular embodiment. Functionality may be separated or combined in blocks differently in various realizations or described with different terminology.

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A computer-implemented method, comprising:
    receiving an input for selecting an area of an image that comprises a plurality of pixels and applying a filter to the selected image area, the selected image area is less than an entirety of the image, and the plurality of pixels in the selected image area includes one or more potential features;
    determining a detectability of the one or more potential features in the selected image area;
    based on the determined detectability of the one or more potential features in the selected image area, automatically determining a tolerance threshold for the selected image area such that the tolerance threshold is specific to the plurality of pixels in the selected image area; and
    applying the filter to the selected image area but not to unselected areas of the image to filter the plurality of pixels in the selected image area while preserving the one or more potential features that are detected according to the automatically determined tolerance threshold, application of the filter to the plurality of pixels in the selected image area being based in part on a color weight coefficient of each pixel, the color weight coefficient being determined according to a linear relationship of the tolerance threshold to a difference between a color channel for the respective pixel and a center pixel when the difference is less than the tolerance threshold.

2. The method of claim 1, wherein each pixel of the plurality of pixels is characterized using a color space and the color space for each pixel comprises one or more said color channels.

3. The method of claim 2, wherein said automatically determining the tolerance threshold comprises:
    adjusting the tolerance threshold up if the potential features are easily detectable; and
    adjusting the tolerance threshold down if the potential features are not easily detectable.

4. The method of claim 2, wherein said determining the detectability of the one or more potential features in the selected image area comprises:
    using a respective one or more said color channels for each pixel of the plurality of pixels to calculate a color distribution for the selected image area; and
    calculating an output value for each pixel by calculating a difference between the one or more said color channels for the respective pixel and the center pixel and comparing the difference to the color distribution, the center pixel located at a center of the plurality of pixels.

5. The method of claim 1, further comprising:
    receiving an input specifying an initial tolerance threshold and adjusting the initial tolerance threshold based on the plurality of pixels to said automatically determine the tolerance threshold for the selected image area.

6. The method of claim 4, wherein said automatically determining the tolerance threshold for the selected image area comprises using the color distribution scaled by a range for the one or more said color channels.

7. The method of claim 6, further comprising:
    receiving an input specifying a starting value for the tolerance threshold and using the starting value to multiply the color distribution scaled by the range for the one or more said color channels to said automatically determine the tolerance threshold.

8. The method of claim 4, further comprising:
    using the color weight coefficient for each pixel; and
    using a spatial weight coefficient for each pixel.

9. A system, comprising:
    one or more processors; and
    a memory coupled to the one or more processors configured to store program instructions executable by the one or more processors to implement operations comprising:
    receiving an input for selecting an area of an image that comprises a plurality of pixels and applying a filter to the selected image area, the selected image area is less than an entirety of the image, and the plurality of pixels in the selected image area includes one or more potential features;
    determining a detectability of the one or more potential features in the selected image area;
    based on the determined detectability of the one or more potential features in the selected image area, automatically determining a tolerance threshold for the selected image area such that the tolerance threshold is specific to the plurality of pixels in the selected image area; and
    applying the filter to the selected image area to change the plurality of pixels in the selected image area but preserve the one or more potential features that are detected using the automatically determined tolerance threshold, the unselected portions of the image are unchanged by said applying the filter, application of the filter to the plurality of pixels in the selected image area being based in part on a color weight coefficient of each pixel, the color weight coefficient being determined according to a linear relationship of the tolerance threshold to a difference between a color channel for the respective pixel and a center pixel when the difference is less than the tolerance threshold.

10. The system of claim 9, wherein each pixel of the plurality of pixels is characterized using a color space and the color space for each pixel comprises one or more said color channels.

11. The system of claim 10, wherein said automatically determining the tolerance threshold comprises:
adjusting the tolerance threshold up if the potential features are easily detectable; and
adjusting the tolerance threshold down if the potential features are not easily detectable.

12. The system of claim 10, wherein said determining the detectability of the one or more potential features in the selected image area comprises:
using a respective one or more said color channels for each pixel of the plurality of pixels to calculate a color distribution for the selected image area; and
calculating an output value for each pixel by calculating a difference between the one or more said color channels for the respective pixel and the center pixel of the plurality of pixels and comparing the difference to the color distribution, the center pixel located at a center of the plurality of pixels.

13. The system of claim 9, wherein the operations further comprise:
receiving an input specifying an initial tolerance threshold and adjusting the initial tolerance threshold based on the plurality of pixels to said automatically determine the tolerance threshold for the selected image area.

14. The system of claim 12, wherein said automatically determining the tolerance threshold for the selected image area comprises using the color distribution scaled by a range for the one or more said color channels.

15. The system of claim 12, wherein the operations further comprise:
receiving an input specifying a starting value for the tolerance threshold and using the starting value to multiply the color distribution scaled by the range for the one or more said color channels to said automatically determine the tolerance threshold.

16. The system of claim 12, wherein the operations further comprise:
using the color weight coefficient for each pixel; and
using a spatial weight coefficient for each pixel.

17. A computer-readable storage medium storing program instructions that are computer-executable to implement operations comprising:
receiving an input for selecting an area of an image that comprises a plurality of pixels and applying a filter to the selected image area, the selected image area is less than an entirety of the image, and the plurality of pixels in the selected image area includes one or more potential features;
determining a detectability of the one or more potential features in the selected image area;
based on the determined detectability of the one or more potential features in the selected image area, automatically determining a tolerance threshold for the selected image area such that the tolerance threshold is specific to the plurality of pixels in the selected image area; and
applying the filter to the selected image area to change the plurality of pixels in the selected image area according to the filter but preserve the one or more potential features that are detected using the automatically determined tolerance threshold, application of the filter to the plurality of pixels in the selected image area being based in part on a color weight coefficient of each pixel, the color weight coefficient being determined according to a linear relationship of the tolerance threshold to a difference between a color channel for the respective pixel and a center pixel when the difference is less than the tolerance threshold.

18. The computer-readable storage medium of claim 17, wherein each pixel of the plurality of pixels is characterized using a color space and the color space for each pixel comprises one or more said color channels.

19. The computer-readable storage medium of claim 18, wherein said automatically determining the tolerance threshold comprises:
adjusting the tolerance threshold up if the potential features are easily detectable; and
adjusting the tolerance threshold down if the potential features are not easily detectable.

20. The computer-readable storage medium of claim 18, wherein said determining the detectability of the one or more potential features in the selected image area comprises:
using a respective one or more said color channels for each pixel of the plurality of pixels to calculate a color distribution for the selected image area; and
calculating an output value for each pixel by calculating a difference between the one or more said color channels for the respective pixel and the center pixel and comparing the difference to the color distribution, the center pixel located at a center of the plurality of pixels.

21. The computer-readable storage medium of claim 17, wherein the operations further comprise:
receiving an input specifying an initial tolerance threshold and adjusting the initial tolerance threshold based on the plurality of pixels to said automatically determine the tolerance threshold for the selected image area.

22. The computer-readable storage medium of claim 20, wherein said automatically determining the tolerance threshold for the selected image area comprises using the color distribution scaled by a range for the one or more said color channels.

23. The computer-readable storage medium of claim 22, wherein the operations further comprise:
receiving an input specifying a starting value for the tolerance threshold and using the starting value to multiply the color distribution scaled by a range for the one or more said color channels to said automatically determine the tolerance threshold.

24. The computer-readable storage medium of claim 20, wherein the operations further comprise:
using the color weight coefficient for each pixel; and
using a spatial weight coefficient for each pixel.

25. A computer-implemented method, comprising:
executing instructions on a specific apparatus so that binary digital electronic signals representing an input are received for selecting an area of an image and applying a filter tool to produce a selected image area to which the filter is applied, the selected image area includes a feature and comprises a plurality of pixels that are less than an entirety of the image;

executing instructions on the specific apparatus to determine a detectability of the feature in the selected image area;

executing instructions on the specific apparatus to automatically determine a tolerance threshold for the selected image area that is specific to the plurality of pixels in the selected image area and based on the determined detectability of the feature in the selected image area;

executing instructions on the specific apparatus to apply the filter tool to the selected image area to change the pixels in the selected image area but preserve the feature by determining a similarity of each pixel to its neighboring pixels within the plurality of pixels based on the tolerance threshold, and changing pixels that are determined to be similar but not changing pixels that are determined to be dissimilar, unselected areas of the image are excluded from application of the filter tool, application of the filter to the pixels in the selected image area being based in part on a color weight coefficient of each pixel, the color weight coefficient being determined according to a linear relationship of the tolerance threshold to a difference between a color channel for the respective pixel and a center pixel when the difference is less than the tolerance threshold; and storing a result of applying the filter tool in a memory location of said specific apparatus.

* * * * *